April 12, 1966   D. A. ESSEX   3,245,413
CORN HUSKING MECHANISM
Filed Dec. 23, 1963   3 Sheets-Sheet 1

INVENTOR.
DUANE A. ESSEX
BY William A. Murray
ATTORNEY

April 12, 1966  D. A. ESSEX  3,245,413
CORN HUSKING MECHANISM
Filed Dec. 23, 1963  3 Sheets-Sheet 2
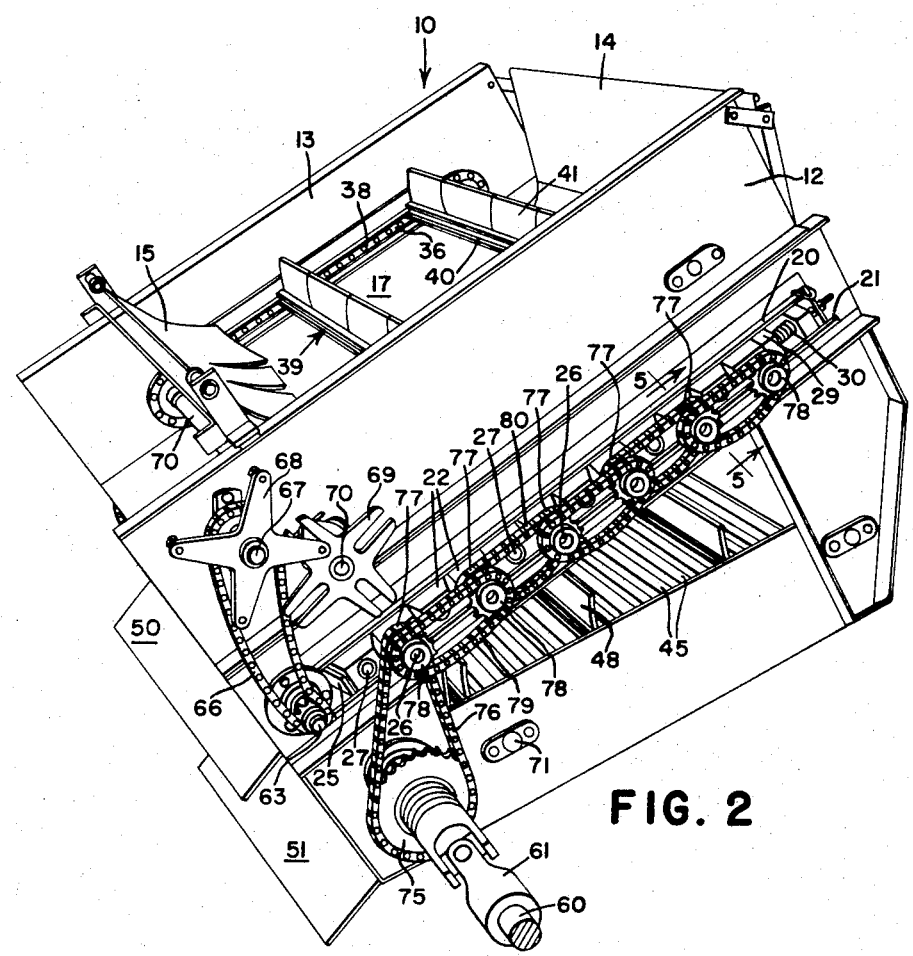
FIG. 2
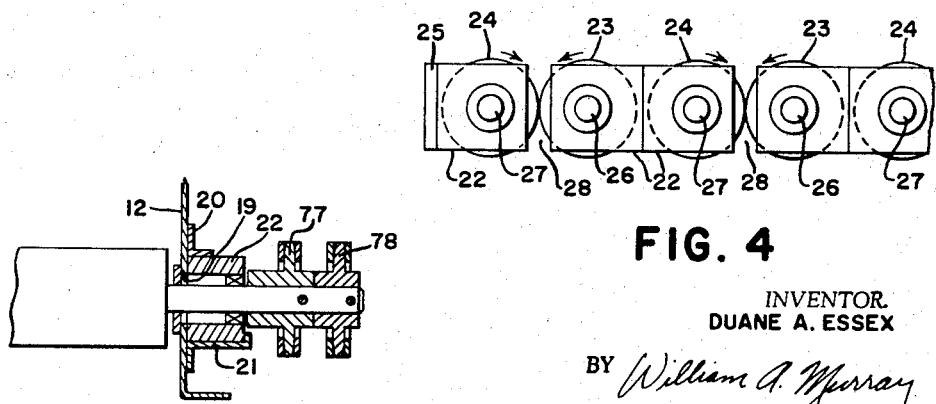
FIG. 5
FIG. 4
INVENTOR.
DUANE A. ESSEX
BY William A. Murray
ATTORNEY April 12, 1966 D. A. ESSEX 3,245,413
CORN HUSKING MECHANISM Filed Dec. 23, 1963 3 Sheets-Sheet 3

INVENTOR.
DUANE A. ESSEX
BY *William A. Murray*
ATTORNEY

United States Patent Office 3,245,413
Patented Apr. 12, 1966

3,245,413
CORN HUSKING MECHANISM
Duane A. Essex, Ankeny, Iowa, assignor to Deere & Company, Moline, Ill., a corporation of Delaware
Filed Dec. 23, 1963, Ser. No. 332,675
5 Claims. (Cl. 130—5)

This invention relates to a corn husking mechanism adapted to be carried as a part of a basic corn harvester. Still more particularly this invention relates to a corn husking mechanism using a new and novel type of feeding and conveying means in combination with a new and novel type of husking roll supporting mechanism.

In the conventional type of corn husker there is provided a series of parallel pairs of husking rolls with a conveyor positioned above the rolls for moving ears of corn along the rolls. The rolls are disposed longitudinally in respect to the direction of travel of the conveyor and are also normally inclined so that ears of corn move from an upper end to a lower end of the husking bed.

It is proposed in the present invention to support the husking rolls in a disposition transverse to the direction of motion of the conveyor. The conveyor has flight portions substantially parallel to the husking rolls and operates to both rotate the ears of corn on the husking rolls as well as to move the ears from adjacent pairs of husking rolls.

It is a further object of the present invention to use in combination with the above type of conveyor and husking roll disposition a stop-and-go drive so that the flights on the conveyor move the ears of corn between adjacent pairs of husking rolls and also operate to restrict movement of the ears. It is considered advantageous to provide such a drive since when the conveyor is in the stop portion of its cycle, the husking rolls have the opportunity to husk the ears of corn. As the conveyor moves intermittently the ears of corn move and at the same time rotate onto the adjacent pair of rolls. Consequently through the present structure the ears of corn have both an opportunity or a time delay sufficient to permit husking and also the conveyor operates to roll the ears as it moves the ears between the pairs of husking rolls.

It is a further object of the present invention to provide a new and novel type of mounting arrangement for the rolls. The rolls are normally supported on two basic uprights at opposite ends of the rolls. The uprights carry longitudinal tracks adjacent the ends of the rolls. The rolls are supported in bearing blocks adapted to slide on the tracks. The blocks are disposed so as to carry rolls in pairs with fixed centers and spaced apart relative to one another. However, the rolls of one pair engage one each of the rolls of the two next adjacent pairs. Drive means is provided to cause the engaging sides of the rows to move downwardly and consequently the husking nip is formed so that the husks will move downwardly as they are removed from the corn ear. Biasing means in the form of a spring is provided at one end of the bearing blocks and operate to automatically move the bearing blocks along the tracks so that the engaging sides of the rolls are always in contact with one another and with sufficient pressure to remove the husks.

Other objects and advantages of the present invention will become apparent to those skilled in the art as the nature of the invention is better undersood from the following description and as shown in the accompanying drawings.

FIG. 1 is a rear perspective view of the husking mechanism and showing a part of a rear discharge elevator of a corn harvester and the interrelation between the elevator and the husking bed.

FIG. 2 is a front perspective view of the husking mechanism.

FIG. 4 is an end view showing the husking rolls and the bearing blocks supporting the husking rolls.

FIG. 5 is a sectional view taken substantially along the line 5—5 of FIG. 2.

FIG. 6 is a plan view showing the husking mechanism and the drives effecting the rotation of the individual rolls.

Figure 3:
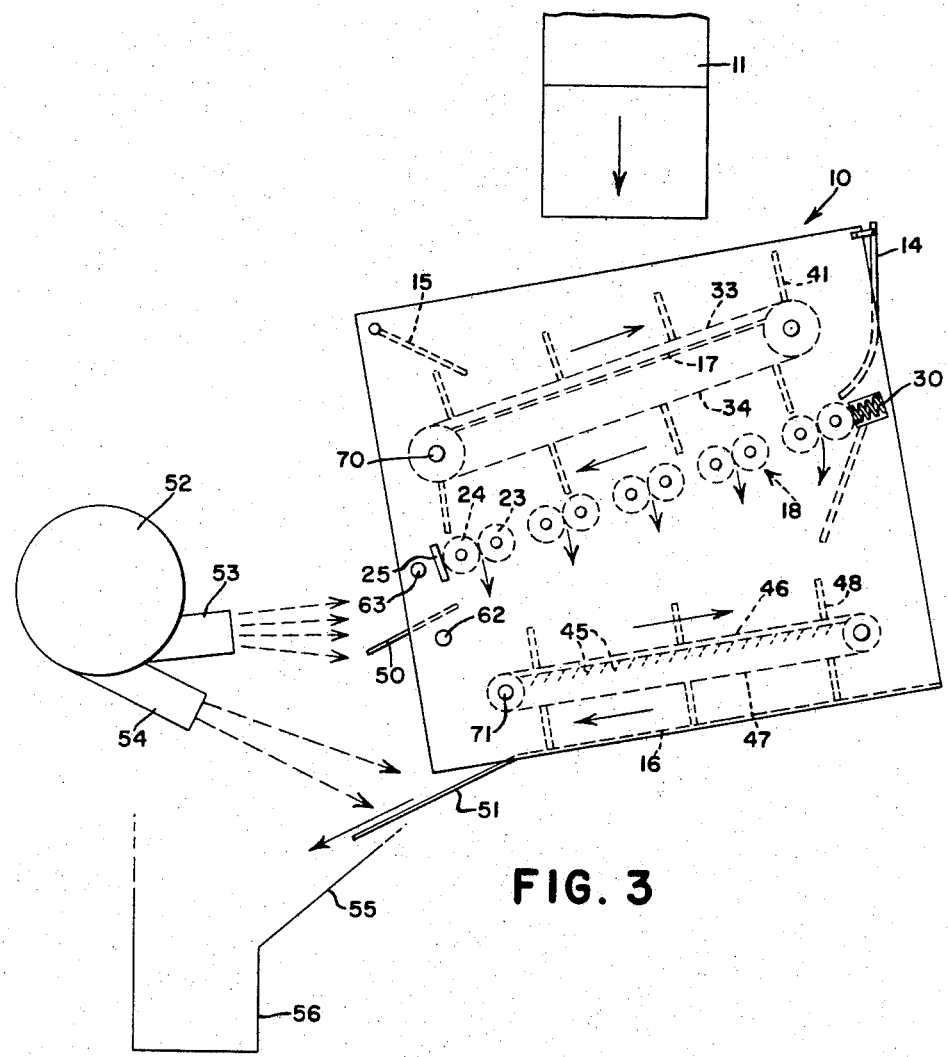
FIG. 3 is a schematic view of the husking mechanism showing in schematic form additional parts effective to collect and remove trash as well as the corn from the husking unit.

Referring now to the drawings, the husking mechanism is of the type that may be incorporated at the rear of a corn harvester or in any of the conventional types of uses that require husking mechanism. The husking mechanism, indicated in its entirety by the reference numeral 10, normally receives unhusked ears of corn from the rear end of a harvester as indicated by the elevator 11. The husking unit 10 is composed of a housing structure having a front upright support 12 and a rear upright support 13. The front and rear supports 12, 13 are spaced apart fore-and-aft and are interconnected and partially enclosed at one end by an end panel 14. Extending across the upper portion of the opposite ends of the walls 12, 13 is a second panel 15 defining with those panels and the end panel 14 an upwardly opening inlet through which material may be received from the discharge end of the elevator 11. Except for the panels 14, 15, opposite ends of the housing are generally open and operate as discharge areas for the corn following its husking treatment and the trash and husks.

As may be seen from reviewing the figures, the entire housing structure is inclined from an outer end adjacent the panel 14 to a lower discharge end at the end having the transverse panel 15. The housing structure further has a laterally disposed floor panel 16 interconnecting the lower edges of the wall structure 12, 13 and a laterally disposed inclined impinging panel 17 which receives corn gravitating from the elevator 10. The panel 17 terminates short of the end panel 14 to provide an opening through which the corn may move onto a husking bed, indicated in its entirety by the reference numeral 18. The husking bed 18 is composed of a plurality of pairs of husking rolls extending transversely across the spacing between the upright structures 12, 13. The upright structures 12, 13 have elongated inclined slots, such as shown at 19 (FIG. 5). Above and below the slots are track means in the form of inclined angle iron members 20 positioned above the slots 19 and Z-shaped members 21 positioned beneath the slots 19. The members 20, 21 cooperate to form guideways or tracks receiving journal blocks 22 for sliding movement parallel to the slots. The blocks 22 operate in pairs and support shaft extensions 26, 27 of husking rolls 23, 24 also disposed in pairs of first and second rolls respectively. Abutment plates 25 project from the faces of the wall structures 12, 13 and contact the lowermost blocks 22. The shafts 26, 27 project outwardly from opposite ends of the rolls 23, 24 through the end wall structures 12, 13 and into the bearing blocks 22. The blocks carrying the lowermost roll 24 abuts against the abutments 25. The remaining rolls are carried by the blocks 22 and the blocks are so disposed and support the shafts 26, 27 eccentric to the center of the blocks so that the blocks 22 supporting each pair of rolls 23, 24 abuts one another and maintain the rolls 23, 24 of each pair in spaced apart relation. The pairs of rolls have their first rolls 23 contacting the second rolls 24 of the next adjacent pair. There is sufficient spacing, as indicated at 28, between blocks 22 of each pair so that the latter contact between the surfaces of the rolls 23, 24 is always present. Consequently should wear occur on the rolls 23, 24 the bearing blocks 22 will be premitted to slide along the tracks 20, 21 to retain the contact. At the upper end of the tracks 20, 21 there is provided a biasing block 29 backed by a spring 30 that maintains pressure on the blocks 22 and with the contacting surfaces of the rolls 23, 24 so that the contact maintained is at a substantially constant pressure.

An overhead conveyor, indicated in its entirety by the reference numeral 35 is disposed above the husking bed and underneath the material inlet that opens upwardly from the housing structure. An upper run 33 is positioned above the perforated panel 17 and a lower run 34 is positioned above the husking bed. The conveyor is of a continuous chain type having a pair of oppositely disposed continuous chains 37, 38 inwardly and adjacent the walls 12, 13 respectively and interconnected by transverse flight structure 39 in a disposition generally parallel to the husking rolls 23, 24. The flight structures 39 are composed of a transverse metal strap 40 and a plurality of outwardly extending flexible flights 41. The flights 41 are divided into sections, with four sections for each flight and are composed of a rubber or flexible material, such as may be constructed of tire carcasses.

In operation the material will move onto the panel 17 and the upper run 33 will sweep the material upwardly and toward the end panel 14 where it will be guided downwardly onto the husking rolls 23, 24. The flighting 41 will contact the ears and move them downwardly toward the lower end of the husking bed.

Positioned beneath the husking bed is a grille structure composed of a series of parallel transversely disposed rods 45 that extend across the housing structure and are connected, by suitable means, to the upright supports 12, 13. The grille structure is positioned above the floor 16. Also provided beneath the husking bed is a second continuous flight type conveyor having an upper run 46 positioned above the grille 45 and a lower run beneath the grille 45 and above the floor 16. The conveyor has transversely extending flights 48. As the husks pass through the husking bed, they will pass onto the grille rods 45 and the flight 48 of the upper run 46 will move the husks upwardly to a trash discharge at the upper end of the housing structure. Incidental kernels of corn having passed through the husking bed will also pass between the grille rods 45 and onto the floor 16. The flights 48 of the lower run 47 will contact the kernels and move them toward the lower end of the housing structure. Positioned and fixed to the housing structure at the lower discharge end is a pair of vertically spaced inclined panels 50, 51 extending between the upright structures 12, 13. The upper panel 50 is positioned beneath the lower husking roll 24 and operates to receive material gravitating from the end of the husking bed. The lower panel 51 extends downwardly from the floor panel 16 and receives the kernels of corn passing off of that panel. Positioned outwardly from the panels 50, 51 is a blower, shown in representative form at 52 in FIG. 3 having a pair of discharge ducts 53, 54 directing a stream of air at the panels 50, 51, the purpose being so that the incidental trash passing with the ears of corn and with the kernels of corn are blown into the housing structure and out of the upper trash discharge end. A hopper 55 and a lower end of a discharge elevator 56 receives the ears of corn and the kernels of corn from the panels 50, 51. The elevator and hopper 56 and 55 are also shown only in representative form in FIG. 3.

The drive for the entire husking unit includes a main power source such as a drive shaft 60 that may be connected to a power take-off shaft of a tractor, not shown. A universal joint 61 is provided between the main drive shaft 60 and a drive shaft 62 extending between and journaled on the upright wall structures 12, 13 and connected to a countershaft 63 by a chain drive 64 including an overrunning clutch 65. The shaft 63 extends across the housing structure to an end outside of the wall structure 12 connected by means of a chain drive 66 to a stub shaft 67. A lugged wheel 68, forming one part of a Geneva drive, is supported on the shaft 67. A slotted wheel 69, forming the second part of the Geneva drive, is fixed to one end of the upper conveyor drive shaft 70 that operates to drive the conveyor chains 37, 38 of the upper drive conveyor. The opposite end of the shaft 70 is drivingly connected by a chain drive 72 to a conveyor drive shaft 71 of the lower trash discharge conveyor. The Geneva drive will operate to move both conveyors intermittently or in increments so as to move the ears of corn and trash in a stop-and-go movement.

Supported on the conveyor drive shaft 62 and adjacent the wall structure 12 is a sprocket 75 drivingly connected to the shaft portion 26 of the lowermost husking roll 23 by means of a chain 76 and a sprocket 77 carried on the shaft 26.

Viewing FIG. 2, it becomes apparent that each of the shafts 26 carries a sprocket 77 thereon and also a second outer sprocket 78. The shafts are interconnected by chains, such as at 79, and the sprockets 77 are interconnected by chains 80 so that each of the shafts 26 will rotate in the same direction. On the opposite ends of the shafts 26 adjacent to and outwardly of the wall structure 13 are provided gears 85 that mesh with gears 86 supported on the shafts 27 that carry the husking rolls 24. By the gear drive 85, 86 the contacting sides of the husking rolls 23, 24 will be caused to move downwardly and consequently the husks removed from the corn ears will move downwardly.

In operation, unhusked ears of corn will gravitate through the upper inlet of the housing structure 10 from the elevator 11. The upper run 33 of the upper conveyor will move the unhusked ears of corn over the panel 17 and onto the husking bed. The lower run 34 will then move the ears of corn downwardly toward the lower end of the husking bed. It should here be emphasized the importance of the Geneva or intermittent drive since the flights 41 will operate not only to move the ears over the transverse husking roll, but will also operate to momentarily restrict movement of the ears over the husking bed. In the stop-and-go movement of the ears, the husking rolls 23, 24 will have a momentary opportunity to dislodge the husks before the conveyor moves them along the husking bed. Also, should the ears tend to move by gravitation down to the lower end of the husking bed, the flights 41 will operate as retainers to prevent the fast movement of the ears. Consequently a more efficient type husking will occur through use of the present type of overhead conveyor. As the husks leave the husking bed, they will be discharged from the housing structure 10 by means of the upper flight 46 of the lower conveyor. As previously mentioned the incidental kernels of corn that might be shelled in the husking operation will pass through the bars 45 and onto the floor 16 to be moved through the lower end of the housing and collected and moved into the elevator 56. The intermittent drive will effect turning of the husks and aid in separation of the incidental kernels from the husks.

While only one form of the invention has been shown, it should be recognized that other forms and variations will occur to those skilled in the art. Therefore, while the present disclosure was shown and described in detail, it should be understood that such disclosure was for the purpose of clearly and concisely illustrating the principles of the invention and it was not intended to limit or narrow the invention beyond the broad concepts set forth in the appended claims.

What I claim is:

1. A husking mechanism comprising: an elongated upright housing structure having an upwardly opening material intake and material discharge openings at opposite ends; a husking bed supported in the housing and inclined from an upper end adjacent one end of the housing to a lower end adjacent the opposite end of the housing, the husking bed being composed of a series of parallel pairs of rolls disposed transversely to the inclination of the bed; a laterally disposed panel supported in the housing under the intake and above the bed; a continuous overhead conveyor with an upper run positioned to move material on the panel and a lower run adapted to pass closely adjacent the husking bed and to move material toward the lower end of the bed and to the discharge opening at that end, the conveyor having a plurality of transverse flights spaced lengthwise thereon; a floor beneath the husking bed; a continuous waste conveyor beneath the husking bed for receiving waste and incidental material from the bed and composed of an upper run for moving waste out of the discharge opening at the opposite end and a lower run for moving the incidental material over the floor to the discharge opening at the end adjacent the lower end of the husking bed; a grille between the upper and lower runs of the trash conveyor retaining the trash from passage and permitting the incidental material to pass onto the floor; a pair of inclined deflector plates disposed in the discharge opening beneath the lower end of the husking bed and trash conveyor respectively for receiving the husked material and incidental material; a main power source; drive means between the power source and the conveyors and husking rolls including a drive to the overhead conveyor effecting a stop-and-go advance of the flights whereby the material will advance intermittently over the husking bed and will be restricted in movement between the intermittent advances; and blower means outside of the housing effecting a draft of air toward the deflector plates and into the housing.

2. A husking mechanism comprising: an elongated upright housing structure having an upwardly opening material intake and a material discharge opening at one end; a husking bed supported in the housing and inclined from an upper end adjacent one end of the housing to a lower end adjacent the opposite end of the housing, the husking bed being composed of a series of parallel pairs of rolls disposed transversely to the inclination of the bed; a laterally disposed panel supported in the housing under the intake and above the bed; a continuous overhead conveyor with an upper run positioned to move material on the panel and a lower run adapted to pass closely adjacent the husking bed and to move material toward the lower end of the bed and to the discharge opening at that end, the conveyor having a plurality of transverse flights spaced lengthwise thereon; a main power source; and drive means between the power source and the conveyor and husking rolls including a drive to the conveyor effecting a stop-and-go advance of the flights whereby the material will advance intermittently over the husking bed, and will be restricted in movement between the intermittent advances.

3. A husking mechanism comprising: an elongated upright housing structure with longitudinally spaced ends and having an upwardly opening material intake and a material discharge opening at one end and a material discharge opening at the opposite end; a husking bed supported in the housing between opposite ends of the housing, the husking bed being composed of a series of parallel pairs of transverse rolls; a laterally disposed panel supported in the housing under the intake and above the bed; a continuous overhead conveyor with an upper run positioned to move material on the panel and a lower run adapted to pass closely adjacent the husking bed and to move material over the bed and toward the discharge opening at said opposite end, the conveyor having a plurality of transverse flights spaced lengthwise thereon; a main power source; and drive means between the power source and the conveyor and husking rolls effecting a stop-and-go advance of the flights whereby the material will advance intermittently over the husking bed, and will be restricted in movement by the flights between the intermittent advances.

4. A husking unit comprising: a main support including spaced apart uprights; a husking bed having a plurality of pairs of husking rolls extending transversely across the spacing between the uprights; a conveyor mounted on the support with flight means parallel to the rolls and adapted to move in increments transversely over the rolls in a stop-and-go movement whereby material will intermittently be moved by the flight means across the rolls and will intermittently be restricted in movement by the flights; track means on the uprights; supporting blocks slidably mounted on the track means supporting the rolls thereon in pairs composed of first and second transverse rolls spaced apart a predetermined distance with one side of the first roll of each pair engaging one side of the second roll of the next adjacent pair; means between the support and blocks biasing the blocks along the track means automatically maintaining engagement between the aforesaid sides of the rolls; and drive means effecting movement of the conveyor and rotation of the rolls so as to create downward movement of the engaging sides of the rolls.

5. A husking unit comprising: a main support including spaced apart uprights; a husking bed having a plurality of pairs of husking rolls extending transversely across the spacing between the uprights; a conveyor mounted on the support with flight means parallel to the rolls and adapted to move in increments transversely over the rolls in a stop-and-go movement whereby material will intermittently be moved by the flight means across the rolls and will intermittently be restricted in movement by the flights; and drive means effecting intermittent movement of the conveyor and rotation of the rolls.

References Cited by the Examiner
UNITED STATES PATENTS

| | | | |
|---|---|---|---|
| 707,013 | 8/1902 | Richards | 130—5 |
| 768,166 | 8/1904 | Barnard | 130—5 |
| 865,445 | 9/1907 | Titus et al. | 130—5 |
| 1,019,838 | 3/1912 | Rickel | 130—5 |
| 1,417,356 | 5/1922 | Smith | 130—5 |
| 2,675,808 | 4/1954 | Hecht | 130—5 |
| 2,935,834 | 5/1960 | Vaughn | 130—5 |
| 3,103,240 | 9/1963 | Minera | 130—50 X |

ABRAHAM G. STONE, *Primary Examiner.*

ANTONIO F. GUIDA, JOE O. BOLT, *Examiners.*